United States Patent
Suehira et al.

(10) Patent No.: US 8,202,075 B2
(45) Date of Patent: Jun. 19, 2012

(54) IMPRINT APPARATUS AND IMPRINT METHOD

(75) Inventors: Nobuhito Suehira, Kawasaki (JP); Junichi Seki, Yokohama (JP); Masao Majima, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 11/462,187

(22) Filed: Aug. 3, 2006

(65) Prior Publication Data
US 2007/0035056 A1    Feb. 15, 2007

(30) Foreign Application Priority Data
Aug. 12, 2005 (JP) .................... 2005-234291

(51) Int. Cl.
*B29C 35/08* (2006.01)

(52) U.S. Cl. ........... 425/140; 425/174.4; 425/169; 425/150; 264/40.4; 264/40.1; 264/494; 977/887

(58) Field of Classification Search ......... 264/40.1, 264/494, 401, 40.4; 425/174.4, 169, 150, 425/140; 977/887
See application file for complete search history.

(56) References Cited

U.S. PATENT DOCUMENTS

| | | | |
|---|---|---|---|
| 5,515,167 A | | 5/1996 | Ledger et al. |
| 5,751,427 A | | 5/1998 | De Groot |
| 5,923,033 A | * | 7/1999 | Takayama et al. ........ 250/234 |
| 6,128,085 A | | 10/2000 | Buermann et al. |
| 6,522,411 B1 | | 2/2003 | Moon et al. |
| 6,541,287 B2 | | 4/2003 | Ino et al. |
| 7,303,703 B2 | * | 12/2007 | Hocheng et al. .......... 264/40.1 |
| 2003/0081971 A1 | * | 5/2003 | Nakayama .................. 399/350 |
| 2003/0210408 A1 | | 11/2003 | Jun et al. |
| 2004/0021254 A1 | * | 2/2004 | Sreenivasan et al. ........ 264/406 |
| 2004/0141163 A1 | * | 7/2004 | Bailey et al. ................. 355/18 |
| 2004/0183236 A1 | * | 9/2004 | Ogino et al. ................. 264/496 |
| 2004/0191478 A1 | * | 9/2004 | Nishikawa et al. ........... 428/141 |
| 2004/0200411 A1 | | 10/2004 | Willson et al. |
| 2005/0143483 A1 | * | 6/2005 | Sanuki et al. ............... 522/99 |
| 2008/0000375 A1 | * | 1/2008 | Nielsen et al. ............ 101/450.1 |

FOREIGN PATENT DOCUMENTS

| | | |
|---|---|---|
| KR | 0415123 B1 | 12/2003 |
| WO | WO 2006/016006 A1 * | 2/2006 |

OTHER PUBLICATIONS

Stephen Y. Chou et. al., "Imprint of Sub-25 nm Vias and Trenches in Polymers," 67(21) *Appl. Phys. Lett.* 3114-16 (1995).

* cited by examiner

*Primary Examiner* — Christina Johnson
*Assistant Examiner* — Saeed Huda
(74) *Attorney, Agent, or Firm* — Fitzpatrick, Cella, Harper & Scinto

(57) ABSTRACT

An imprint apparatus for imprinting a pattern formed on a mold in a resin material formed on a substrate with accuracy is constituted by a light source for irradiating the resin material with light for curing the resin material; a measuring device for measuring a physical value which reflects a state of the resin material resulting from the irradiation of light from the light source; and a controller for controlling a spatial positional relationship between the mold and the substrate or an amount of light from the light source on the basis of information obtained from the measuring device.

10 Claims, 5 Drawing Sheets

IMPRINT APPARATUS AND IMPRINT METHOD

FIELD OF THE INVENTION AND RELATED ART

The present invention relates to an imprint apparatus for transferring a pattern formed on a mold onto a work or workpiece (member to be processed) and an imprint method.

In recent years, a fine processing technology for imprinting a fine pattern formed on a mold in a work such as resin material or metal material has been developed and has received attention. This technology has a resolution on the order of several nanometers, so that it is called nanoimprint or nanoembossing. Further, the fine processing technology is capable processing a steric structure at a wafer level as a single unit, so that it has been expected to be applied to a wide variety of fields including production technologies of an optical device such as photonic crystal etc., micro total analysis system (μ-TAS), biochip.

Application of imprint processing to a semiconductor fabrication technology has been described in Stephan Y. Chou et al., Appl. Phys. Lett., Vol. 67, Issue 21, pp. 3114-3116 (1995). More specifically, a mold including a photocurable resin material on which a desired pattern is formed is pressed against a work such as a semiconductor wafer including a substrate on which a photocurable resin material is formed and is further pressurized, followed by irradiation with ultraviolet light to cure the photocurable resin material. As a result, the pattern is improved in the resin material. Then, by effecting etching with the resin material as a mask, it is possible to effect pattern transfer onto the substrate.

As described above, the above described imprint processing is promising as the semiconductor fabrication technology. Further, as the recent need for high definition fine processing is further increased, a further improvement of an imprint accuracy is required.

SUMMARY OF THE INVENTION

In view of the above circumstances, an object of the present invention is to provide an imprint apparatus capable of improving an imprint accuracy.

Another object of the present invention is to provide an imprint method which are capable of improving an imprint accuracy.

According to an aspect of the present invention, there is provided an imprint apparatus for imprinting a pattern formed on a mold in a resin material formed on a substrate, comprising:

a light source for irradiating the resin material with light for curing the resin material;

a measuring device for measuring a physical value which reflects a state of the resin material resulting from the irradiation of light from the light source; and a controller for controlling a spatial positional relationship between the mold and the substrate or an amount of light from the light source on the basis of information obtained from the measuring device.

Herein, examples of the physical value which reflects the state of the resin material may include optical characteristics of the resin material, such as a refractive index, a reflectance, an absorbance, and an extinction coefficient. Further, when light irradiation is effected in order to cure the resin material, a volume of the resin material is changed, so that a distance between the mold and the substrate, a thickness of the resin material, and a load to be applied to the resin material are also the physical value which reflects the state of the resin material.

Further, the spatial positional relationship between the mold and the substrate includes the distance between the mold and the substrate, a positional relationship between the mold and the substrate in an in-plane direction, and an angle of the mold with respect to the substrate.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the present invention will be described with reference to the drawings. Incidentally, herein, the distance between the mold and the substrate means a distance between an outermost processing surface of the mold and an outermost surface to be processed of the substrate.

Embodiment

In this embodiment, a control system of an imprint apparatus according to the present invention will be described.

Figure 1:
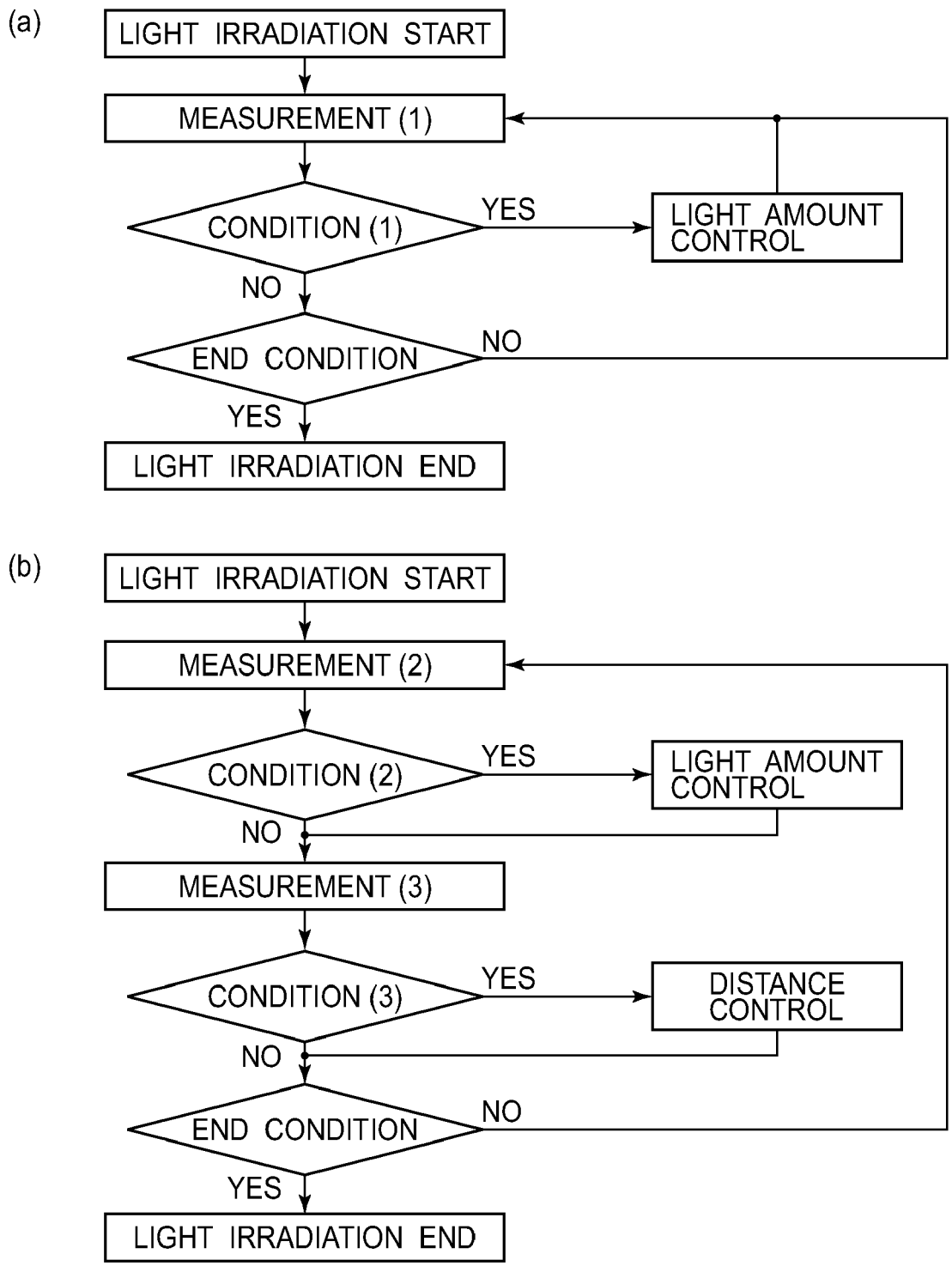
FIGS. 1(a) and 1(b) are flow charts each for explaining an embodiment of a control system of an imprint apparatus according to the present invention.

FIGS. 1(a) and 1(b) are flow charts each for explaining a control system of the imprint apparatus in this embodiment. The flow chart of FIG. 1(a) shows the case where an amount of light (light amount) is controlled by measuring various physical values which reflect a state of a resin material resulting from light irradiation. On the other hand, the flow chart of FIG. 1(b) shows the case where the light amount and a distance between a mold and a substrate as a spatial positional relationship between the mold and the substrate by measuring various physical values which reflect the state of the resin material resulting from light irradiation.

In the case of FIG. 1(a), after irradiation of light from a light source is started, measurement (1) is effected. In measurement (1), a physical value which reflects a state of a resin material is measured.

Here, an optical characteristic of the resin material, the distance between the mold and the resin material, a thickness of the resin material (layer) as the physical value reflecting the state of the resin material can be measured by a light measuring system or the like described later. A load to be applied to the mold as the physical value reflecting the resin material state can be measured by a load cell (load converter) or the like.

Next, after the above described measurement (1) is effected, control of light amount is effected when the above measured physical value satisfies condition (1).

For example, first, light irradiation is effected at a large light amount and the light amount of light irradiation can be decreased in the case where a refractive index is changed with the light irradiation to reach a predetermined value. In this case, almost all the resin material is cured in a short time by effecting the light irradiation at a large amount of light, so that it is possible to suppress a flowability of the resin material. Thereafter, by effecting control such that the light amount is decreased, the flowability of uncured resin material is principally alleviated. As a result, it is possible to cure the resin material in a uniform thickness. More specifically, a pattern of mold is not uniform but is sparse or dense, so that the resin material causes expansion or contraction by the light irradiation. As a result, a stress is generated, so that the mold is deformed so as to alleviate the stress after being released in some cases, thus resulting in a poor shape accuracy of the pattern. Accordingly, by effecting the light amount control in the above described manner, it is possible to improve imprint accuracy.

In a subsequent step of judgement of the above-described condition (1), when an end condition is satisfied, the light irradiation is completed. When the end condition is not satisfied, the procedure is returned to the above-described step of measurement (1) and the above-described respective steps are repeated.

Here, as the end condition, it is possible to employ a lapse of predetermined time or no change in refractive index for a certain time.

The predetermined value of the condition (1) may also be set and provided in a plurality of values such as a first refractive index and a second refractive index which may be appropriately selected depending on the number of loop including the condition (1), the light amount control, and the measurement (1). In the above described control procedure, only the light amount is controlled on the basis of the measurement but in the present invention, only the distance between the mold and the substrate may also be controlled. Further, it is also possible to control the light amount and the distance at the same time.

Further, the physical value once measured is reproducible in many cases, so that by measuring a change with time of the physical value reflecting the resin material state, it is possible to set the measurement (1) as an elapsed time and the condition (1) as an elapsed time for a desired physical value in a subsequent process. Further, it is also possible to control the imprint apparatus in such a manner that a physical value is measured in advance by a measuring mechanism provided outside the imprint apparatus and the control of the imprint apparatus is effected on the basis of measured data. In this case, the measuring device is not necessarily required to be disposed within the imprint apparatus.

As a control method of light amount, it is possible to use a method of controlling a power of the light source, a method of interposing a filter or a shutter between the mold and the light source, etc. In the case of using the filter or the shutter, a mechanism capable of mounting the filter or the shutter with respect to the imprint apparatus. The filter may also be modified so as to partially change a transmittance of light by a constitution of the mold.

In the case of FIG. 1(b), first, an optical characteristic of the resin material is measured after the light irradiation from the light source is started. Then, the light amount is controlled when the optical characteristic of the resin material satisfies condition (2). Thereafter, in a step subsequent to the light amount control or judgement such that the optical characteristic of the resin material does not satisfy the condition (2), a distance between the mold and the substrate is measured. Next, when the distance satisfies condition (3), control of the distance between the mold and the substrate is effected. Then, in a step subsequent to judgement on the condition (3), the light irradiation is completed when an end condition is satisfied. When the end condition is not satisfied, the procedure is returned to the step of measurement (2) described above in which the above described respective steps are repeated.

For example, in the case where a refractive index of the resin material is a predetermined value in the step of condition (2), as described above, such a control that the light amount is decreased is effected. In this state, the resin material has a microscopically cured portion and a microscopically uncured portion, so that the resin material is suppressed in flowability but is in such a state that it is deformable. Next, as a result of the light irradiation to the resin material, the thickness of the resin material is increased and when the distance between the mold and the substrate is a predetermined value in the step of condition (3), it is possible to effect such a control that the mold is pressed against the resin material so as to decrease the thickness of the resin material. On the other hand, in the case where the thickness of the resin material is decreased and the distance is a predetermined value, it is possible to effect such a control that the distance is increased. By effecting such controls, the thickness of the resin material can be controlled to a desired value, so that it is possible to improve imprint accuracy.

In the above described flow chart, the distance between the mold and the substrate is controlled after the light amount is controlled by the light amount may also be controlled after the distance between the mold and the substrate is controlled. Further, measurements of the optical characteristic and the distance between the mold and the substrate may be performed by different measuring devices or the same measuring device.

As another example, the predetermined value for condition (2) is set to a refractive index providing a state in which the resin material is not completely cured. In the case where this condition is satisfied, control is effected so that the mold and the substrate are moved apart from each other. Thereafter, such a control that the light amount by the light irradiation for curing the resin material is increased is effected. By employing such a constitution, it is possible to readily release the mold from the resin material because of such a state that the resin material is not completely cured. In this case, a force applied to the resin material during the release is decreased, so that it is possible to suppress the deformation of the resin material, thus resulting in an improved accuracy of imprint.

Figure 2:
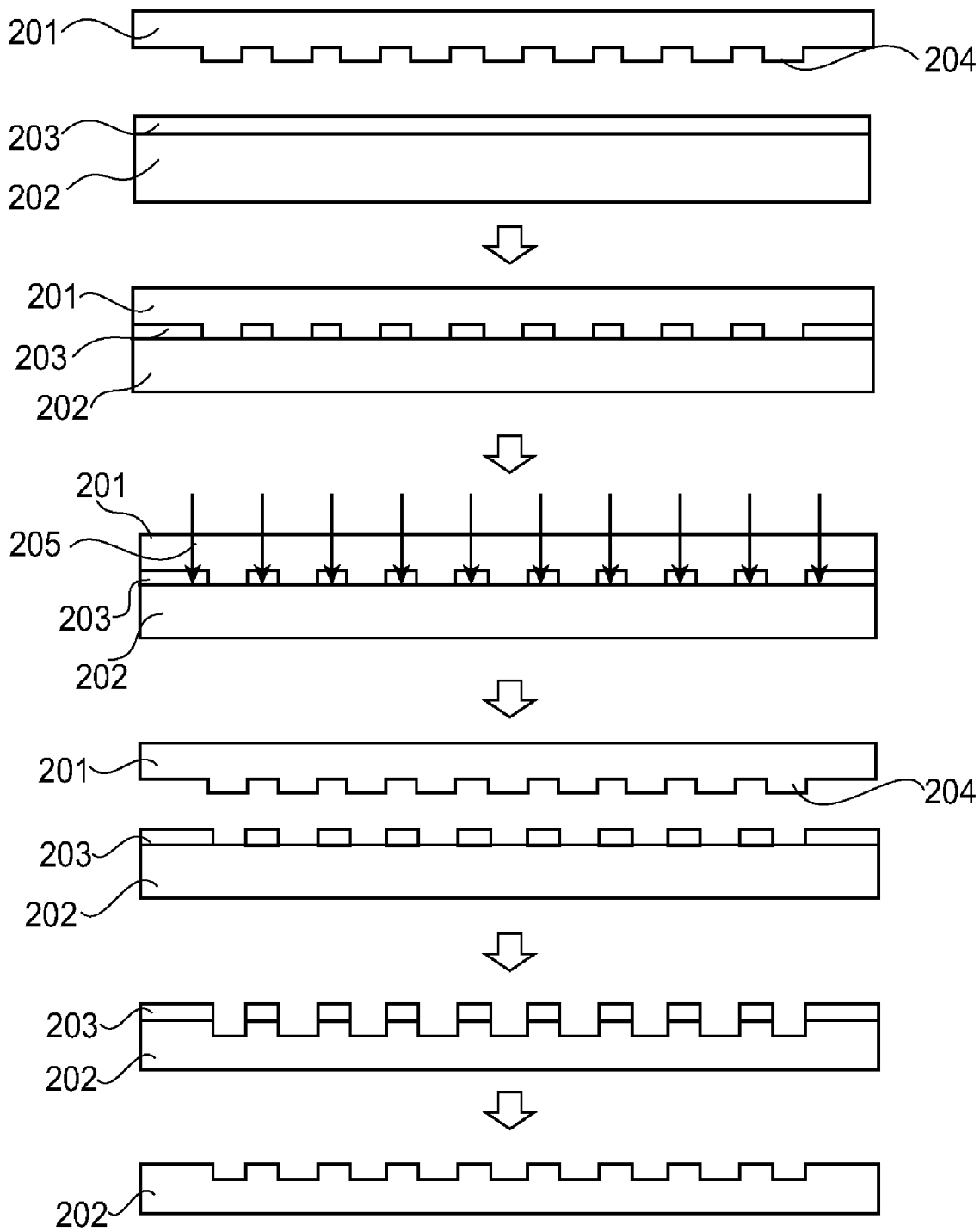
FIG. 2 includes schematic views for illustrating a transfer process of a pattern of a mold onto a substrate.

Next, a process for transferring the pattern of the mold onto the substrate for imprint will be described. FIG. 2 includes schematic views for illustrating the process for transferring a mold structure onto the substrate.

Referring to FIG. 2, the process employs a mold 201, a substrate 202, a photocurable resin material 203, a pattern 204 of the mold, and light 205 emitted from a light source. As the mold 201, a light-transmissive substance such as quartz, pyrex (registered trade mark), or sapphire is used. The mold 201 is provided with the pattern 204 for processing. As the substrate 202, a semiconductor wafer such as Si wafer, a resinous plate, or a glass substrate may principally be used.

First, onto the substrate 202, the photocurable resin material 203 is applied. Then, positional alignment of the mold 201 with the substrate 202 is effected. More specifically, the mold 201 is caused to come near to the substrate 202 and the photocurable resin material 203 to contact the photocurable resin material 203. Next, the photocurable resin material 203 is irradiated with the light 205 to be cured. In this process, the light amount or the spatial positional relationship between the mold and the substrate is controlled. Then, when the mold 201 is moved away from the substrate 202, the pattern of the mold is transferred onto the photocurable resin material 203. Thereafter, etching is performed by using the photocurable resin material 203 as a mask, whereby the pattern 204 of the mold 201 is transferred onto the substrate 202. Finally, when the photocurable resin material 203 is removed from the substrate 202, the pattern 204 of the mold 201 is formed on the substrate 202.

Next, such a constitution that an optical measuring system is used for measuring the physical value reflecting the resin material state in the imprint apparatus according to the present invention will be described.

Figure 3:
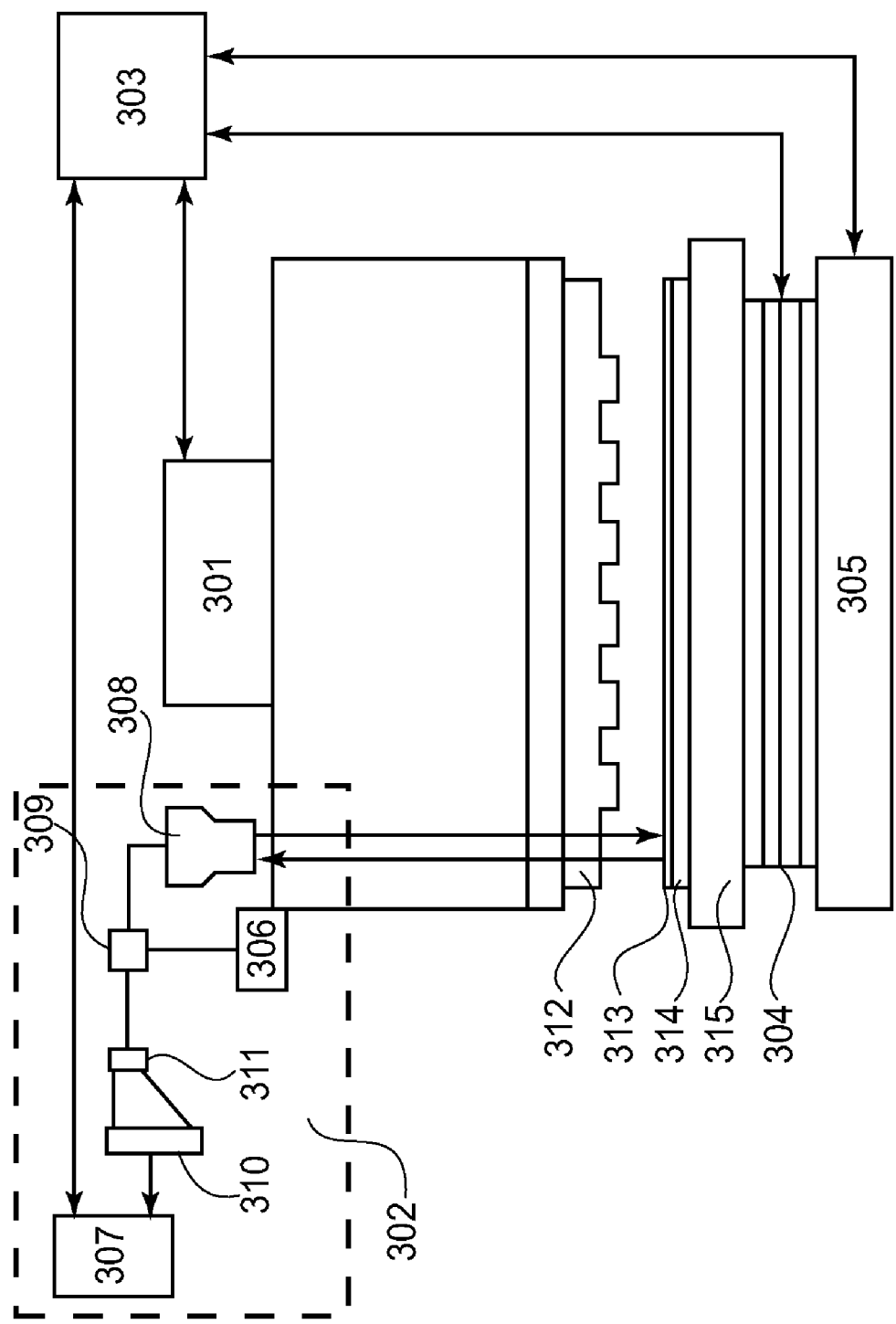
FIG. 3 is a schematic view for illustrating an embodiment of the case of using a light measuring system as a measuring system of the imprint apparatus according to the present invention.

FIG. 3 shows the constitution of the imprint apparatus provided with an optical measuring device in this embodiment. Referring to FIG. 3, the constitution includes an exposure light source 301, an optical measuring system 302, a control system 303, a work pressing mechanism 304, an XY-moving mechanism 305, and a work holding mechanism 315. The optical measuring system 302 is constituted by a light source 306 for measurement, an analysis system 307, a microscope 308, a beam splitter 309, an image pickup device 310, and a spectroscope 311. The constitution shown in FIG. 3 further includes a mold 312, a photocurable resin material 313, and a substrate 314.

The optical measuring system 302 is used to measure optical characteristics of the photocurable resin material (refractive index n, extinction coefficient k, etc.), a distance between the mold and the substrate, a thickness of the photocurable resin material (layer). The optical measuring system 302 can be constituted by a spectrointerferometer, an ellipsometer, a reflectance meter, a spectrophotometer, etc. Further, it is also possible to employ a plurality of measuring systems so as to measure different physical values.

Hereinafter, the case of using the spectrointerferometer as the optical measuring system 302 will be described.

As the light source 306 for measurement, it is possible to use a lamp having a wide range of spectrum (200 nm-800 nm), a lamp having a visible light range (400 nm-800 nm), several lasers, etc. Light emitted from the light source 306 for measurement reaches the substrate 314 through the beam splitter 309 and the mold 312. The light is reflected by the surface of the mol 312, the surface of the substrate 314, and the photocurable resin material 313, so that resultant reflected light fluxes are interfered with each other. The interfered light is again passed through the beam splitter 309 and is disposed by the spectroscope 311. Then, the light is substituted with intensity data of respective wavelengths by means of the image pickup device 310, followed by analysis by the analysis system 307.

Details of the analysis method will be described later.

Information about the optical characteristics of the photocurable resin material measured by the optical measuring system 302 and the distance between the mold and the substrate is fed black to the control system 303.

Next, the analysis method by the analysis system 307 will be described.

From the intensity data of wavelengths obtained by the image pickup device, it is possible to determine the distance between the mold and the substrate and the thickness of the resin material by using a calculation method such as Fourier transform. Further, it is possible to preliminarily store intensity data calculated from data of the distance between the mold and the substrate, data of the thickness of the photocurable resin material, and the optical characteristics into the analysis system. It is also possible to calculate the intensity data by comparing the data with intensity data measured as reference data. Further, it is also possible to adopt a method of combining these intensity data.

In the case where the distance between the mold and the substrate is decreased in order to reduce an amount of calculation, it is possible to employ such a manner that there is no change in optical characteristic. Further, in the case of effecting the light irradiation, it is possible to employ such a manner that there is no change in distance between the mold and the substrate. It is also possible to reduce the amount of calculation by storing a wavelength dependency of the optical characteristic of the photocurable resin material and an illuminance dependency of the optical characteristic. Further, it is possible to further reduce the amount of calculation by using an encoder of a motor for controlling the distance between the mold and the substrate or by information about the thickness of the substrate and the thickness of the mold.

Hereinbelow, an embodiment of such a method that Fourier transform is used as the analysis method will be described with reference to FIGS. 4(a) and 4(b).

Figure 4:
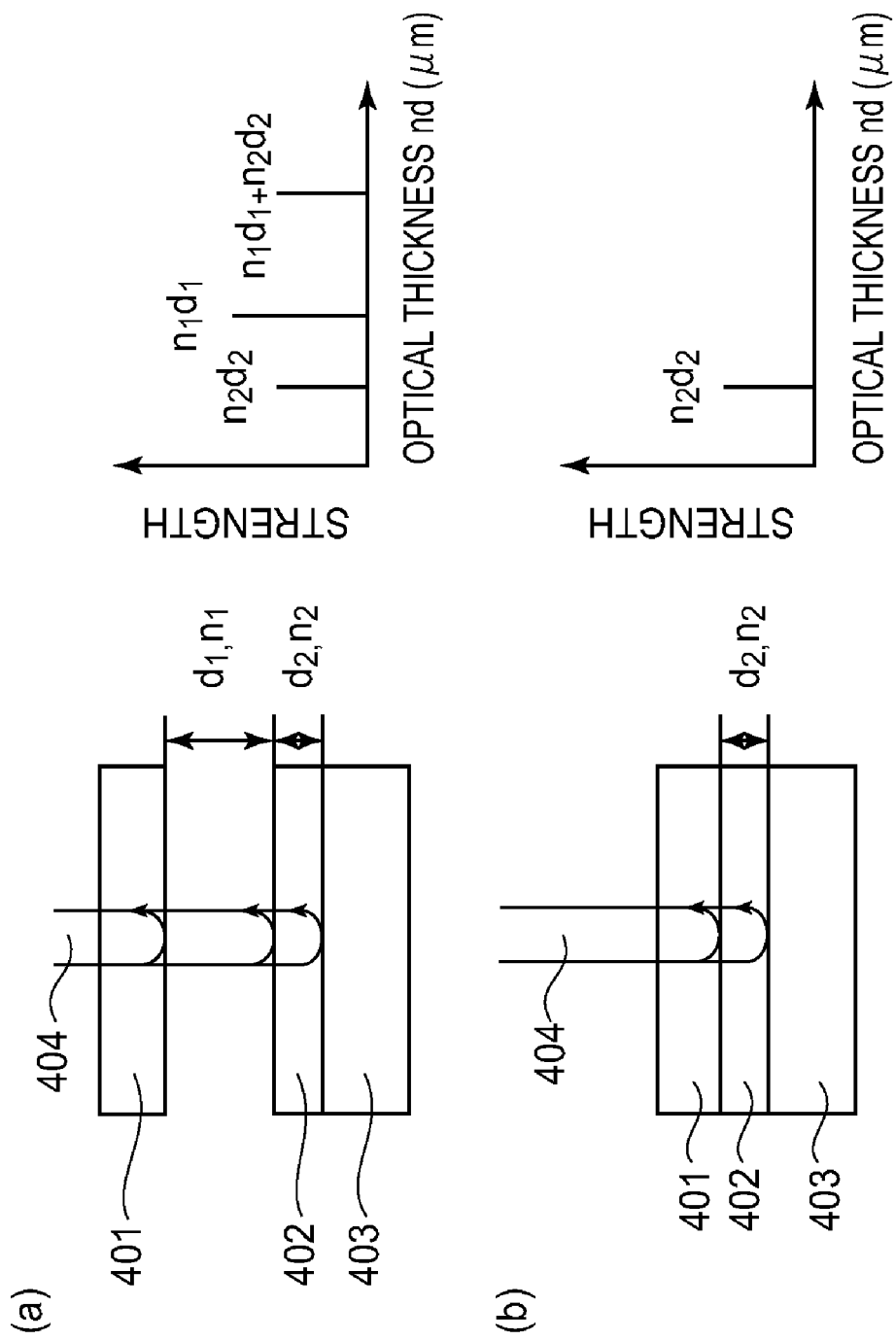
FIGS. 4(a) and 4(b) are schematic views each for illustrating Fourier transform as an embodiment of analysis by an analysis system provided to a measuring device of the imprint apparatus according to the present invention.

FIG. 4(a) includes schematic views for illustrating a relationship between an intensity of measuring light and an optical thickness after Fourier transform in the case where there is a gap between the mold and the photocurable resin material, and FIG. 4(b) includes schematic views for illustrating a relationship between an intensity of measuring light and an optical thickness after Fourier transform in the case where the mold contacts the photocurable resin material.

In these figures, reference numerals 401, 402, 403 and 404 represent a mold, a photocurable resin material layer, a substrate, and measuring light, respectively. As the mold 401, it is also possible to use a mold suitable for measuring optical characteristics described below.

As shown in FIG. 4(a), the photocurable resin material layer 402 having a thickness $d2$ and a refractive index $n2$ is disposed between the mold 401 and the substrate 403. Between the mold 401 and the photocurable resin material 402, there is a gap $d1$ having a refractive index $n1$. When intensity data of measuring light in this state is subjected to Fourier transform, three peaks appear at positions of an optical (path) length $n1d1$ between the mold surface and the photocurable resin material surface, an optical length $n2d2$ (between the photocurable resin material surface and the substrate surface, and an optical length $n1d1+n2d2$ between the mold and the substrate. Here, it is possible to calculate $d1$ and $d2$ by using values stored as $n1$ and $n2$ in the analysis system.

On the other hand, in the case where the mold 401 contacts the photocurable resin material 402 as shown in FIG. 4(b), a peak appears at a position of an optical length $n2d2$. The value $d2$ is substantially constant after the light irradiation, so that it is possible to measure a change in $n2$.

As described above, in the case where the spectrointerferometer is used as the optical measuring system 307, it is possible to measure the optical characteristics of the photocurable resin material, the distance between the mold and the substrate, and the thickness of the resin material layer by the same measuring apparatus. As a result, a constitution of the imprint apparatus can be simplified.

Incidentally, in the case of measuring a load as the physical value, it is possible to use a load cell (not shown in FIG. 3) disposed between the work holding portion 315 and the work pressing mechanism 304.

Hereinbelow, the mold suitable for the imprint apparatus according to the present invention will be described.

When the optical characteristics of a photocurable resin material having a high S/N ratio are measured, the photocurable resin material is required to be formed in a certain degree of thickness. However, a residual film of resin material after the pattern of the mold is imprinted in the resin material is formed in a small thickness in some cases. In view of these cases, in this embodiment, the mold is additionally provided with a pattern for measurement in an area other than an area in which a pattern for processing is formed.

Figure 5:
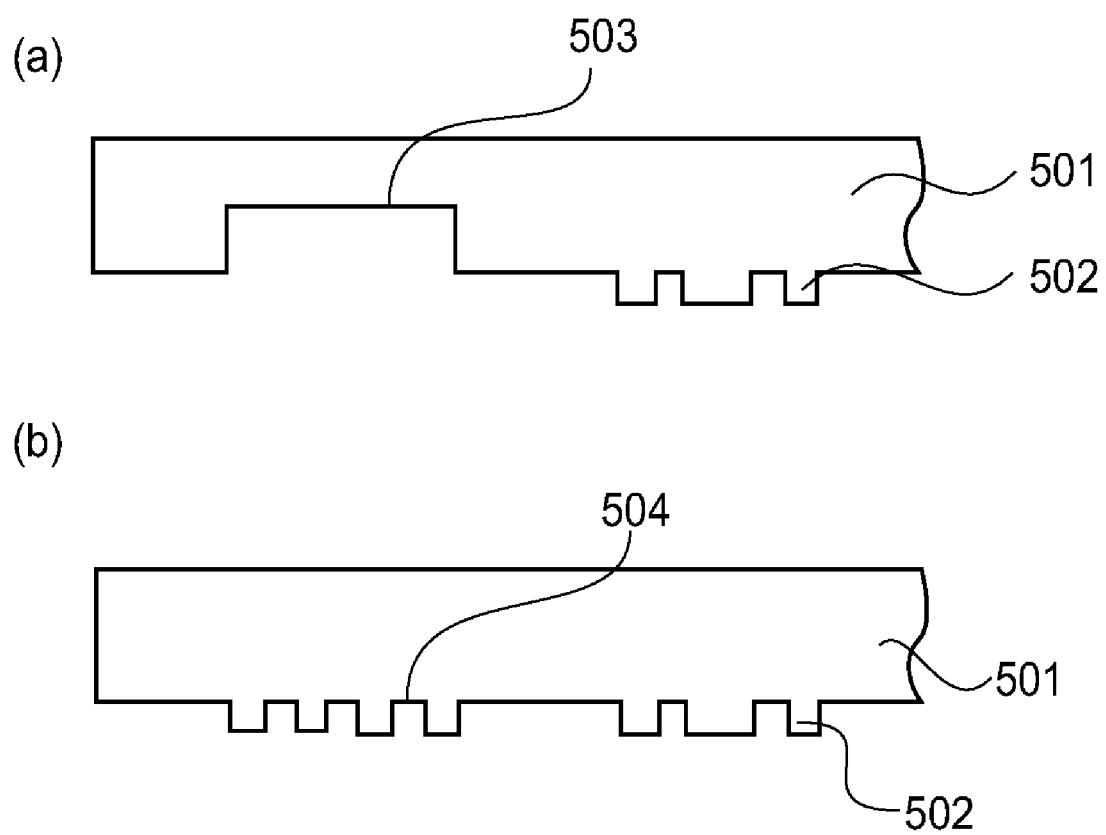
FIGS. 5(a) and 5(b) are schematic views each for illustrating an embodiment of a mold suitable for the imprint apparatus according to the present invention.

FIG. 5(*a*) shows a mold provided with a pattern 503 for measurement, having a depth (height) larger than that of a pattern 502 for processing, in an area other than an area in which the pattern 502 is formed. The pattern 503 for measurement is also larger in depth than ¼ of a wavelength of light.

Further, as shown in FIG. 5(*b*), it is also possible to add a pattern 504 for determining a degree of curing in an area other than an area in which the pattern 502 for processing is formed on a mold 501. By effecting measurement using this pattern 504, it is possible to effect evaluation in a shorter time than that for measuring a degree of curing an entire area. As the mold 501, it is possible to use a light-transmissive substance such as quartz, pyrex (registered trade mark), or sapphire. The surface of the mold 501 is subjected to fine processing through photolithography, EB lithography, FIB, X-ray lithography, etc. Further, it is also possible to process the mold 501 by forming a replica through Ni electroforming or the like.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 234291/2005 filed Aug. 12, 2005, which is hereby incorporated by reference.

What is claimed is:

1. An imprint apparatus for imprinting a pattern formed on a mold in a resin material formed on a substrate, comprising:
   a light source configured to irradiate the resin material with light for curing the resin material;
   a load converter configured to measure a load applied to the mold, which reflects a change in a state of the resin material caused during the curing of the resin material by the irradiation of light from said light source; and
   a controller configured to control an amount of light from said light source on the basis of information obtained from said load converter.

2. An imprint apparatus for imprinting a pattern formed on a mold in a resin material formed on a substrate, comprising:
   a light source configured to irradiate the resin material applied on the substrate in a predetermined area with light for curing the resin material;
   a load converter configured to measure a load applied to the mold during the curing of the resin material by the irradiation of light from said light source; and
   a controller configured to control an amount of light from said light source before the curing of the resin material applied on the substrate in the predetermined area is completed on the basis of information obtained from said a load converter.

3. The apparatus according to claim 1, wherein said controller continues irradiation of the light by decreasing, on the basis of the information obtained from said load converter, the amount of the light when the resin material is judged as being in a predetermined state.

4. The apparatus according to claim 3, wherein said controller completes the irradiation when a predetermined amount of time has elapsed.

5. The apparatus according to claim 3, wherein said controller completes the irradiation when said controller judges that a state of the resin material has not changed over a certain period of time on the basis of the information obtained from said load converter.

6. The apparatus according to claim 1, wherein said controller moves, when said controller judges that a state of the resin material is in a predetermined state on the basis of the information obtained from said load converter, the mold and the substrate apart from each other and increases the amount of light from said light source to continue the irradiation.

7. The apparatus according to claim 2, wherein said controller continues irradiation of the light by decreasing, on the basis of the information obtained from said load converter, the amount of the light when the resin material is judged as being in a predetermined state.

8. The apparatus according to claim 7, wherein said controller completes the irradiation when a predetermined amount of time has elapsed.

9. The apparatus according to claim 7, wherein said controller completes the irradiation when said controller judges that a state of the resin material has not changed over a certain period of time on the basis of the information obtained from said load converter.

10. The apparatus according to claim 2, wherein said controller moves, when said controller judges that a state of the resin material is in a predetermined state on the basis of the information obtained from said load converter, the mold and the substrate apart from each other and increases the amount of light from said light source to continue the irradiation.

* * * * *